US006703056B2

(12) United States Patent
Mehansho et al.

(10) Patent No.: US 6,703,056 B2
(45) Date of Patent: Mar. 9, 2004

(54) BEVERAGE COMPOSITIONS COMPRISING ARABINOGALACTAN AND DEFINED MINERALS

(75) Inventors: Haile Mehansho, Fairfield, OH (US); Renee Irvine Mellican, Bradenton, FL (US); Scott Edward Manchuso, Cincinnati, OH (US); Raul Victorino Nunes, Loveland, OH (US); Kris Eugene Spence, Madeira, OH (US)

(73) Assignee: The Procter + Gamble Co., Cincinnati, OH (US)

( * ) Notice: Subject to any disclaimer, the term of this patent is extended or adjusted under 35 U.S.C. 154(b) by 109 days.

(21) Appl. No.: 09/939,386

(22) Filed: Aug. 24, 2001

(65) Prior Publication Data

US 2002/0136802 A1 Sep. 26, 2002

Related U.S. Application Data

(60) Provisional application No. 60/236,502, filed on Sep. 29, 2000.

(51) Int. Cl.$^7$ .............................. A23L 1/304; A23L 2/00
(52) U.S. Cl. ..................... 426/74; 426/573; 426/590; 426/599
(58) Field of Search ..................... 426/74, 573, 590, 426/599

(56) References Cited

U.S. PATENT DOCUMENTS

| | | | |
|---|---|---|---|
| 3,294,544 A | | 12/1966 | Stanko |
| 3,704,138 A | | 11/1972 | La Via et al. |
| 4,228,198 A | | 10/1980 | Burge et al. |
| 4,786,510 A | | 11/1988 | Nakel et al. |
| 4,950,751 A | | 8/1990 | DeWitt |
| 5,116,969 A | | 5/1992 | Adams et al. |
| 5,139,800 A | | 8/1992 | Anderson et al. |
| 5,292,729 A | | 3/1994 | Ashmead |
| 5,296,245 A | | 3/1994 | Clarke et al. |
| 5,336,506 A | | 8/1994 | Josephson et al. |
| 5,547,997 A | | 8/1996 | Kludas |
| 5,614,501 A | | 3/1997 | Richards |
| 5,756,098 A | | 5/1998 | Price et al. |
| 5,851,578 A | * | 12/1998 | Gandhi .................. 426/590 |
| 5,866,190 A | | 2/1999 | Barey |
| 5,882,520 A | | 3/1999 | Richards et al. |
| 6,004,610 A | | 12/1999 | Wang et al. |
| 6,241,996 B1 | | 6/2001 | Hahn |

FOREIGN PATENT DOCUMENTS

| | | |
|---|---|---|
| EP | 0 138 784 A2 | 8/1984 |
| EP | 0 256 645 | 2/1988 |
| EP | 0 273 001 | 6/1988 |
| EP | 0 328 317 | 8/1989 |
| EP | 0 400 484 | 12/1990 |
| EP | 0 670 167 A1 | 9/1995 |
| EP | 1 106 174 A1 | 6/2001 |
| JP | 2-154673 | 6/1990 |
| JP | 06279291 | 10/1994 |
| JP | 2001333735 | 12/2001 |
| WO | WO 94/13160 | 6/1994 |
| WO | WO 98/04156 | 2/1998 |
| WO | WO 98/06418 | 2/1998 |
| WO | WO 98/22512 | 5/1998 |
| WO | WO 99/01115 | 1/1999 |
| WO | WO 99/15033 | 4/1999 |
| WO | WO 99/17618 | 4/1999 |
| WO | WO 99/55736 | 11/1999 |
| WO | WO 01/47376 A1 | 12/2000 |

OTHER PUBLICATIONS

Siebert, Karl J., Carrasco, Aurea, and Lynn, Penelope Y. "Formation of Protein—Polyphenol Haze in Beveages"; Journal Agric. Food Chem. 1996, 44, 1997–2005.
Product Label: Celestial Seasonings—Echinacea Complete Care Ultimate Blend with Zinc & Vitamin C—1999.
Product Label: Glaceau—Vitamin Water—Defense—Lemon Ice (c + zinc)—Date of public disclosure unknown.
www.npicenter.com/index.asp?actionxNBViewDoc & DocumtnIDx1735—Odwalla Introduces Glorious Morning, Sep. 6, 2001.
www.tropicanasmothies.com Tropicana Smothies—Date of public disclosure unknown, viewed Apr. 19, 2001.
Zhuravskaya, N.A., et al.—"Concentration of proteins as a result of the phase separation of water–protein–polysaccharide systems. I. Phase equilibria in water–milk proteins–polysaccharide systems." International Food Information Service, Database Accession No. 87–1–04–a0037, XP–002194869.

* cited by examiner

*Primary Examiner*—Helen Pratt
(74) *Attorney, Agent, or Firm*—S. Robert Chuey; Kelly McDow-Dunham

(57) ABSTRACT

The present invention is directed to beverage compositions comprising:

a) a first component which is arabinogalactan; and b) a second component comprising one or more minerals selected from the group consisting of zinc, iron, magnesium, calcium, selenium, iodine, and fluorine.

The present compositions are useful to provide beverage compositions which deliver adequate levels of water soluble dietary fiber and important minerals without affecting the product appearance, product taste, and mineral bioavailability. At the same time, the compositions herein deliver the benefits of fiber, one or more of the defined minerals, and/or provide other health benefits, including fighting infection, promoting healthy bacteria, and providing a desired dietary fiber benefit. These and other benefits of the present invention are described herein.

18 Claims, No Drawings

BEVERAGE COMPOSITIONS COMPRISING ARABINOGALACTAN AND DEFINED MINERALS

REFERENCE TO PRIORITY APPLICATION

This patent document claims priority to U.S. Provisional Application Ser. No. 60/236,502, filed Sep. 29, 2000, under 35 U.S.C. §119(e).

FIELD OF THE INVENTION

The present invention is directed to beverage compositions which comprise arabinogalactan and one or more defined minerals without compromising taste, appearance, stability, and bioavailability.

BACKGROUND OF THE INVENTION

Beverage compositions are important for a variety of consumer benefits, for example, hydration, refreshment, energy, relaxation and, of course, nutritive benefits. Mineral supplementation is common in the field of beverage compositions. For example, it is quite common to deliver fruit juices supplemented with calcium or other essential minerals for various nutritive purposes. However, mineral stability can be a serious problem when formulating beverage compositions with minerals, causing such formulation to be either unfeasible or unacceptable due to insolubility and, ultimately, instability of the desired mineral supplement. In such beverage compositions, the mineral will ultimately settle to the bottom of a container which holds the composition. For example, Barey, U.S. Pat. No. 5,866,190, assigned to Systems Bio-Industries, issued Feb. 2, 1999, discloses compositions used for stabilizing non-milk, acidic beverages. Barey further discloses that, in addition to the stabilizing compositions described therein, additional mechanisms such as complexing agents are essential wherein calcium is introduced to the composition. It would therefore be quite desirable to provide a composition suitable for stabilizing minerals which avoid the problems known in the art, as exemplified by Barey.

It is additionally well-known that delivery of adequate levels of dietary fiber and minerals is a challenge that remains to be solved. For instance, providing a composition containing one or more minerals (e.g., calcium) and one or more soluble dietary fibers (e.g., pectin or psyllium) causes problems such as gelling, increased viscosity, flocculation, separation, and decreased mineral bioavailability.

An additional problem related to mineral-supplementation of beverage compositions relates to problematic organoleptic properties associated with such minerals, such as significant off-flavors. Such problems are readily apparent to the consumer and will often preclude the consumer from ingesting a mineral-supplemented composition. It would therefore be additionally desirable to provide a composition which overcomes these problems.

Quite surprisingly, the present inventors have discovered that the above described problems are overcome through combination of a fiber known as arabinogalactan with one or more minerals. This arabinogalactan fiber is useful for providing a dietary fiber benefit to the consumer, as well as additional benefits in the field of immune function. It is therefore quite exciting that this fiber may be used not only to provide these benefits, but to overcome problems associated with mineral and fiber interactions, stabilization of minerals, and organoleptic properties of these minerals. In addition, use of a fiber to attempt this purpose would ordinarily result in increased viscosity and likely unacceptability of the final beverage product. However, it has further been found that the arabinogalactan fiber is not precluded from use due to any problems associated with viscosity. In fact, the beverage compositions of the present invention provide excellent viscosity which is acceptable to the consumer. This and other benefits of the present invention are described herein.

SUMMARY OF THE INVENTION

The present invention is directed to beverage compositions comprising:

a) a first component which is arabinogalactan; and b) a second component comprising one or more minerals selected from the group consisting of zinc, iron, magnesium, calcium, selenium, iodine, and fluorine.

The present compositions are useful to provide beverages which increase the stability and enhance the organoleptic properties of minerals, as well as deliver the benefits of fiber, one or more of the defined minerals, and/or provide other health benefits, including fighting infection, promoting healthy bacteria, and providing a desired dietary fiber benefit. The present compositions deliver dietary fiber and important minerals without the commonly observed problems associated with simultaneous delivery of dietary fiber and minerals including, for example, gelling, viscosity, separation, metallic aftertaste, astringency, and poor bioavailability. These and other benefits of the present invention are described herein.

DETAILED DESCRIPTION OF THE INVENTION

Publications and patents are referred to throughout this disclosure. All references cited herein are hereby incorporated by reference.

All percentages and ratios are calculated by weight unless otherwise indicated. All percentages and ratios are calculated based on the total composition unless otherwise indicated.

All component or composition levels are in reference to the active level of that component or composition, and are exclusive of impurities, for example, residual solvents or by-products, which may be present in commercially available sources.

Referred to herein are trade names for components including various ingredients utilized in the present invention. The inventors herein do not intend to be limited by materials under a certain trade name. Equivalent materials (e.g., those obtained from a different source under a different name or reference number) to those referenced by trade name may be substituted and utilized in the methods herein.

In the description of the invention various embodiments and/or individual features are disclosed. As will be apparent to the ordinarily skilled practitioner, all combinations of such embodiments and features are possible and can result in preferred executions of the present invention.

The methods herein may comprise, consist essentially of, or consist of any of the elements as described herein.

Compositions of the Present Invention

The present invention is directed to beverage compositions comprising:

a) a first component which is arabinogalactan; and b) a second component comprising one or more minerals selected from the group consisting of zinc, iron, magnesium, calcium, selenium, iodine, and fluorine.

The present compositions are useful to provide beverages which increase the stability and enhance the organoleptic properties of minerals, as well as deliver the benefits of fiber, one or more of the defined minerals, and/or provide other health benefits, including fighting infection, promoting healthy bacteria, and providing a desired dietary fiber benefit. These and other benefits of the present invention are described herein.

First Component

The first component of the present compositions is arabinogalactan. Arabinogalactan is a polysaccharide which varies in molecular weight from low molecular weight polymers to large macromolecules. Arabinogalactan is also commonly referred to as larch gum, larch wood sugar, galactoarabinan, L-arabino-D-galactan, and stractan. Arabinogalactan is obtained from several plant and tree sources including, for example, the genus Larix (also referred to as Larex) which may contain up to about 35% of arabinogalactan within the total heartwood of some species. See Stout, "Larch Arabinogalactan", *Industrial Gums*, R. L. Whistle Ed., Academic Press, New York, pp. 307–310 (1959). Preferably, the arabinogalactan used herein is derived from tree sources of the genus Larix, particularly the species referred to as the Western larch (*Larix occidentalis*). Non-limiting examples of arabinogalactan sources include the Western larch (*Larix occidentalis*), Tamarack (also referred to as the Eastern larch, *Larix larcicina*), Alpine larch (*Larix lyallii*), European larch (*Larix decidua*), Mongolian larch (*Larix dahurica*), Japanese larch (*Larix leptolepis*), and Siberian larch (*Larix siberica*). Numerous other trees, woody plants and root crops also contain arabinogalactan as part of their cell wall. For example, other suitable sources of arabinogalactan include hemlock, black spruce, douglas fir, cedar, juniper, sugar maple, radishes, carrots, onions, soy bean, and green coffee beans. Additionally, arabinogalactan is found in botanicals, for example, echinacea and mistletoe.

The structure of arabinogalactan has been extensively studied. See e.g., Timell, *Adv. Carbohydrate Chem.*, Vol. 20, pp. 409–483 (1965). Arabinogalactan is a polysaccharide containing beta-(1,3)-linked galactan backbone with side chains containing arabinose and galactose residues, and often other minor residues. Preferably, the ratio of arabinose residues to galactose resides is from about 0.1:1 to about 1:1. Arabinogalactan includes naturally occurring or synthetic arabinogalactan, portions of arabinogalactan (such as degradation products), and chemically or biochemically modified arabinogalactan or portions thereof (as described below). Preferably, the arabinogalactan is a naturally occurring arabinogalactan, isolated from one or more natural sources. As also used herein "refined arabinogalactan" means arabinogalactan having a purity greater than about 95%, preferably greater than about 99%. Refined arabinogalactan of greater than about 95% purity, and even greater than about 99% purity, for example LAREX UF and LARACARE A200) is commercially available from (for example) Larex International, Inc. of St. Paul, Minn., U.S.A.

In a preferred embodiment, the molecular weight of arabinogalactan is from about 1,000 to about 2,500,000, more preferably from about 6,000 to about 300,000, even more preferably from about 10,000 to about 100,000, and most preferably from about 10,000 to about 50,000. Molecular weight may be assessed by standard means including, for example, size exclusion liquid chromatography.

Non-limiting examples of preferred, commercially available sources of arabinogalactan include LAREX UF, LARACARE A200, IMMUNENHANCER (CAS No. 9036-66-2), CLEARTRAC, FIBERAID, and AC-9, all commercially available from (for example) Larex International, Inc. of St. Paul, Minn., U.S.A.

Arabinogalactan is water soluble over a wide range of temperatures. The arabinogalactan molecule likely has a spherical shape when dissolved in water. Increasing concentrations of arabinogalactan have been found to lower the interfacial tension between water and mineral oil. Arabinogalactan remains soluble even at high concentrations, resulting in stable, low viscosity solutions.

Modified arabinogalactan is also useful in the present invention, and is within the definition of arabinogalactan as is used herein. Such modified arabinogalactan includes lipidated arabinogalactan which is described in Richards, WO 98/22512, assigned to the University of Montana, published May 28, 1998. In such example, lipidated arabinogalactan refers to a naturally occurring arabinogalactan covalently attached to a lipophilic group. Preferred lipophilic groups include long chain (i.e., at least about 8 carbon atoms) hydrocarbon groups. Other lipophilic groups include steroids, terpenes, fat soluble vitamins, phytosterols, terpenoids, phospholipids, glycerols, and natural or synthetic fats. The lipophilic group may be attached directly to the natural arabinogalactan or via a linking group. Other non-limiting examples of modified arabinogalactans include those described in Mak et al., WO 99/55736, assigned to Larex, Inc., published Nov. 4, 1999 (referred to as "arabinogalactan derivatives").

Various methods have been developed for recovering arabinogalactan from natural sources. Typically, arabinogalactan is recovered from tree sources (e.g., a tree of the genus Larix) by chipping or grinding the wood and extracting it with water or dilute acidic solutions. The arabinogalactan extract obtained from the wood may be purified to obtain a highly refined arabinogalactan solution required in various commercial uses. Particularly preferred, although non-limiting, processes for obtaining arabinogalactan from natural sources are set forth in Price et al., U.S. Pat. No. 5,756,098, assigned to the University of Montana, Larex International, Inc., and Crown Iron Works Co., issued May 26, 1998, as well as Adams et al., U.S. Pat. No. 5,116,969, assigned to Larex International, Inc., issued May 26, 1992. For example, the fibrous natural material is compressed in the substantial absence of any added solvent to product a liquid exudate and a "first" pressed product. The "first" pressed product may be impregnated with, for example, an aqueous solvent, to recover a liquid pressate and a "second" pressed product. Using this process, a substantially pure arabinogalactan exudate can be produced. Example 1 of Price et al. sets forth a non-limiting example demonstrating extraction of arabinogalactan from Western larch.

The compositions of the present invention preferably comprise from about 0.0001% to about 75% arabinogalactan, more preferably from about 0.001% to about 50% arabinogalactan, still more preferably from about 0.001% to about 15% arabinogalactan, even more preferably from about 0.01% to about 10% arabinogalactan, and most preferably from about 0.1% to about 5% arabinogalactan, all by weight of the composition. Alternatively, the compositions preferably comprise from about 0.1 milligrams to about 40 grams of arabinogalactan, more preferably from about 500 milligrams to about 5 grams of arabinogalactan, all per single dose (i.e., serving size) of the composition.

Second Component

The second component herein comprises one or more defined minerals, which are selected from zinc, iron, magnesium, calcium, selenium, iodine, and fluorine. These minerals are described in further detail below. At this juncture, it is noted that minerals in addition to zinc, iron, magnesium, calcium, selenium, iodine, and fluorine may optionally be included within the compositions herein; for simplicity, however, such additional minerals are not included within the description of the second component.

Preferably, the second component herein comprises one or more minerals selected from zinc, iron, magnesium, and calcium. Most preferably, the second component comprises one or more minerals selected from zinc, iron, and calcium. Particularly preferred minerals for use herein include zinc and iron.

As used herein, "zinc" is inclusive of any compound containing zinc, including a salt, complex, or other form of zinc, including elemental zinc. Acceptable forms of zinc are well-known in the art. The zinc which can be used in the present invention can be in any of the commonly used forms such as, e.g., zinc lactate, zinc sulfate, zinc chloride, zinc acetate, zinc gluconate, zinc ascorbate, zinc citrate, zinc aspartate, zinc picolinate, amino acid chelated zinc, and zinc oxide. Zinc gluconate and amino acid chelated zinc are particularly preferred. Additionally, it has been found that amino acid chelated zinc is most highly preferred, as this zinc form provides optimized bioavailability of the zinc, other minerals present within the composition, as well as optimizing the bioavailability of the arabinogalactan utilized in the composition.

Amino acid chelates of zinc are well-known in the art, and are described in, for example, Pedersen et al., U.S. Pat. No. 5,516,925, assigned to Albion International, Inc., issued May 14, 1996; Ashmead, U.S. Pat. No. 5,292,729, assigned to Albion International, Inc., issued Mar. 8, 1994; and Ashmead, U.S. Pat. No. 4,830,716, assigned to Albion International, Inc., issued May 16, 1989. These chelates contain one or more natural amino acids selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these amino acids.

Additionally, encapsulated zinc is also preferred for use herein.

Zinc fortified compositions of the present invention typically contain at least about 1 milligram of zinc, more preferably at least about 5 milligrams of zinc, and most preferably at least about 10 milligrams of zinc. Typically, from about 10 milligrams to about 25 milligrams of zinc is recommended. Alternatively, the present compositions preferably comprise from 0% to about 0.1% zinc, more preferably from about 0.0001% to about 0.08% zinc, even more preferably from about 0.0002% to about 0.05% zinc, and most preferably from about 0.0002% to about 0.03% zinc, by weight of the composition. As used herein, recitations of mass or weight percent of zinc in any given composition refers to the mass or weight percent of the zinc-containing component (for example, the amino acid chelated zinc component), rather than the mass or weight percent of the elemental zinc which is part of the zinc-containing component. Of course, wherein elemental zinc is utilized as the zinc, the mass or weight percent of zinc in any given composition refers to that of the elemental zinc.

As used herein, "iron" is inclusive of any compound containing iron, including a salt, complex, or other form of iron, including elemental iron. Acceptable forms of iron are well-known in the art.

Non-limiting examples of ferrous iron sources which can be used in the present invention include ferrous sulfate, ferrous fumarate, ferrous succinate, ferrous gluconate, ferrous lactate, ferrous tartrate, ferrous citrate, ferrous amino acid chelates, and ferrous pyrophsophate, as well as mixtures of these ferrous salts. While ferrous iron is typically more bioavailable, certain ferric salts can also provide highly bioavailable sources of iron. Non-limiting examples of ferric iron sources that can be used in the present invention are ferric saccharate, ferric ammonium citrate, ferric citrate, ferric sulfate, ferric chloride, and ferric pyrophosphate, as well as mixtures of these ferric salts. A particularly preferred ferric iron source is ferric pyrophosphate, for example, microencapsulated SUNACTIVE Iron, commercially available from Taiyo International, Inc., Edina, Minn., U.S.A and Yokkaichi, Mie, Japan. SUNACTIVE Iron is particularly preferred for use herein due to its water-dispersibility, particle size, compatibility, and bioavailability.

Ferrous amino acid chelates particularly suitable as highly bioavailable amino acid chelated irons for use in the present invention are those having a ligand to metal ratio of at least 2:1. For example, suitable ferrous amino acid chelates having a ligand to metal mole ratio of two are those of formula:

where L is an alpha amino acid, dipeptide, tripeptide or quadrapeptide reacting ligand. Thus, L can be any reacting ligand that is a naturally occurring alpha amino acid selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these amino acids. See e.g., Pedersen et al., U.S. Pat. No. 5,516,925, assigned to Albion International, Inc., issued May 14, 1996; Ashmead, U.S. Pat. No. 5,292,729, assigned to Albion International, Inc., issued Mar. 8, 1994; and Ashmead, U.S. Pat. No. 4,830,716, assigned to Albion International, Inc., issued May 16, 1989. Particularly preferred ferrous amino acid chelates are those where the reacting ligands are glycine, lysine, and leucine. Most preferred is the ferrous amino acid chelate sold under the trade name FERROCHEL having the reacting ligand as glycine. FERROCHEL is commercially available from Albion Laboratories, Salt Lake City, Utah.

In addition to these highly bioavailable ferrous and ferric salts, other sources of bioavailable iron can be included in the compositions of the present invention. Other sources of iron particularly suitable for fortifying compositions herein certain iron-sugar-carboxylate complexes. In these iron-sugar-carboxylate complexes, the carboxylate provides the counterion for the ferrous (preferred) or ferric iron. The overall synthesis of these iron-sugar-carboxylate complexes involves the formation of a calcium-sugar moiety in aqueous media (for example, by reacting calcium hydroxide with a sugar, reacting the iron source (such as ferrous ammonium sulfate) with the calcium-sugar moiety in aqueous media to provide an iron-sugar moiety, and neutralizing the reaction system with a carboxylic acid (the "carboxylate counterion") to provide the desired iron-sugar-carboxylate complex). Sugars that can be used to prepare the calcium-sugar moiety include any of the ingestible saccharidic materials, and mixtures thereof, such as glucose, sucrose and fructose, mannose, galactose, lactose, maltose, and the like, with sucrose and fructose being the more preferred. The carboxylic acid providing the "carboxylate counterion" can be any ingestible carboxylic acid such as citric acid, malic acid, tartaric acid, lactic acid, succinic acid, and propionic acid, as well as mixtures of these acids.

These iron-sugar-carboxylate complexes can be prepared in the manner described in Nakel et al., U.S. Pat. Nos. 4,786,510 and 4,786,518, issued Nov. 22, 1988. These materials are referred to as "complexes", but they may, in fact, exist in solution as complicated, highly hydrated, protected colloids; the term "complex" is used for the purpose of simplicity.

Additionally, encapsulated iron is also preferred for use herein. For example, ferrous sulfate encapsulated in a hydrogenated soybean oil matrix may be used, for example, CAP-SHURE which is commercially available from Bachem Corp., Slate Hill, N.Y. Other solid fats can be used to encapsulate the iron, such as, tristearin, hydrogenated corn oil, cottonseed oil, sunflower oil, tallow, and lard. A particularly preferred encapsulated iron source is microencapsulated SUNACTIVE Iron, commercially available from Taiyo International, Inc., Edina, Minn., U.S.A. SUNACTIVE Iron is particularly preferred for use herein due to its water-dispersibility and bioavailability.

Iron fortified compositions of the present invention preferably contain at least about 1 milligram of iron, more preferably at least about 5 milligrams of iron, and most preferably at least about 10 milligrams of iron. Typically, from about 10 milligrams to about 25 milligrams of iron is recommended. Alternatively, the present compositions comprise from 0% to about 0.1% iron, more preferably from about 0.0001% to about 0.08% iron, even more preferably from about 0.0002% to about 0.05% iron, and most preferably from about 0.0002% to about 0.03% zinc, by weight of the composition. As used herein, recitations of mass or weight percent of "iron" in any given composition refers to the mass or weight percent of the iron-containing component (for example, the amino acid chelated iron component), rather than the mass or weight percent of the elemental iron which is part of the iron-containing component. Of course, wherein elemental iron is utilized as the "iron", the mass or weight percent of iron in any given composition refers to that of the elemental iron.

As used herein, "magnesium" is inclusive of any compound containing magnesium, including a salt, complex, or other form of magnesium, including elemental magnesium. Acceptable forms of magnesium are well-known in the art.

Magnesium chloride, magnesium citrate, magnesium gluceptate, magnesium gluconate, magnesium hydroxide, magnesium lactate, magnesium oxide, magnesium picolate, and magnesium sulfate are non-limiting, exemplary forms of magnesium for use herein. Additionally, amino acid chelated and creatine chelated magnesium are highly preferred. Amino acid and creatine chelates of magnesium are well-known in the art, and are described in, for example, Pedersen et al., U.S. Pat. No. 5,516,925, assigned to Albion International, Inc., issued May 14, 1996; Ashmead, U.S. Pat. No. 5,292,729, assigned to Albion International, Inc., issued Mar. 8, 1994; and Ashmead, U.S. Pat. No. 4,830,716, assigned to Albion International, Inc., issued May 16, 1989. These chelates contain one or more natural amino acids selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these amino acids.

Typically, wherein magnesium is utilized herein, at least about 1 milligram of magnesium is included per single dose (i.e., serving size) of the composition. More preferably, when used, at least about 50 milligrams of magnesium is included per single dose of the composition. Most preferably, when used, at least about 100 milligrams of magnesium is included per single dose of the composition. About 400 milligrams of magnesium, per single dose of the composition, is recommended for adult humans. Alternatively, the present compositions comprise from 0% to about 1% magnesium, more preferably from about 0.001% to about 0.8% magnesium, even more preferably from about 0.002% to about 0.6% magnesium, and most preferably from about 0.002% to about 0.5% magnesium, by weight of the composition. As used herein, recitations of mass or weight percent of "magnesium" in any given composition refers to the mass or weight percent of the magnesium-containing component (for example, the amino acid chelated magnesium component), rather than the mass or weight percent of the elemental magnesium which is part of the magnesium-containing component. Of course, wherein elemental magnesium is utilized as the "magnesium", the mass or weight percent of magnesium in any given composition refers to that of the elemental magnesium.

As used herein, "calcium" is inclusive of any compound containing calcium, including a salt, complex, or other form of calcium, including elemental calcium. Acceptable forms of calcium are well-known in the art.

Preferred sources of calcium include, for example, amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium titrate, calcium gluconate, calcium realate, calcium tantrate, and calcium lactate, and in particular calcium citrate malate. The form of calcium citrate malate is described in, e.g., Mehansho et al., U.S. Pat. No. 5,670,344, issued Sep. 23, 1997; Diehl et al., U.S. Pat. No. 5,612,026, issued Mar. 18, 1997; Andon et al., U.S. Pat. No. 5,571,441, issued Nov. 5, 1996; Meyer et al., U.S. Pat. No. 5,474,793, issued Dec. 12, 1995; Andon et al., U.S. Pat. No. 5,468,506, issued Nov. 21, 1995; Burkes et al., U.S. Pat. No. 5,445,837, issued Aug. 29, 1995; Dake et al., U.S. Pat. No. 5,424,082, issued Jun. 13, 1995; Burkes et al., U.S. Pat. No. 5,422,128, issued Jun. 6, 1995; Burkes et al., U.S. Pat. No. 5,401,524, issued Mar. 28, 1995; Zuniga et al., U.S. Pat. No. 5,389,387, issued Feb. 14, 1995; Jacobs, U.S. Pat. No. 5,314,919, issued May 24, 1994; Saltman et al., U.S. Pat. No. 5,232,709, issued Aug. 3, 1993; Camden et al., U.S. Pat. No. 5,225,221, issued Jul. 6, 1993; Fox et al., U.S. Pat. No. 5,215,769, issued Jun. 1, 1993; Fox et al., U.S. Pat. No. 5,186,965, issued Feb. 16, 1993; Saltman et al., U.S. Pat. No. 5,151,274, issued Sep. 29, 1992; Kochanowski, U.S. Pat. No. 5,128,374, issued Jul. 7, 1992; Mehansho et al., U.S. Pat. No. 5,118,513, issued Jun. 2, 1992; Andon et al., U.S. Pat. No. 5,108,761, issued Apr. 28, 1992; Mehansho et al., U.S. Pat. No. 4,994,283, issued Feb. 19, 1991; Nakel et al., U.S. Pat. No. 4,786,510, issued Nov. 22, 1988; and Nakel et al., U.S. Pat. No. 4,737,375, issued Apr. 12, 1988.

Typically, wherein calcium is utilized herein, at least about 100 milligrams of calcium is included, per single dose (i.e., serving size) of the composition. More preferably, when used, at least about 200 milligrams of calcium is included per single dose of the composition. Most preferably, when used, at least about 400 milligrams of calcium is included per single dose of the composition. About 1,000 milligrams of calcium, per single dose of the composition, is recommended for adult humans. Preferred compositions of the present invention will comprise from 0% to about 5% calcium, more preferably from about 0.01% to about 0.5% calcium, still more preferably from about 0.03% to about 0.2% calcium, even more preferably from about 0.05% to about 0.15% calcium, and most preferably from about 0.1% to about 0.15% calcium, by weight of the composition. As used herein, recitations of mass or weight percent of "calcium" in any given composition refers to the mass or weight percent of the calcium-containing component (for example, the amino acid chelated calcium component), rather than the mass or weight percent of the elemental calcium which is part of the calcium-containing component. Of course, wherein elemental calcium is utilized as the "calcium", the mass or weight percent of calcium in any given composition refers to that of the elemental calcium.

As used herein, "selenium" is inclusive of any compound containing selenium, including a salt, complex, or other form of selenium, including elemental selenium. Selenium is useful for immune function. Acceptable forms of selenium are well-known in the art.

Selenomethionine is the principal form of selenium found in foods. Also preferred for inclusion herein are elemental selenium and/or selenium yeast.

Typically, wherein selenium is utilized herein, at least about 10 micrograms of selenium is included, per single dose (i.e., serving size) of the composition. More preferably, when used, at least about 15 micrograms of selenium is included, per single dose of the composition. Most preferably, when used, at least about 20 micrograms of selenium is included, per single dose of the composition. From about 10 to about 70 micrograms of selenium, per single dose of the composition, is recommended for adult humans. Preferred compositions of the present invention will comprise from 0% to about 0.1% selenium, more preferably from about 0.00001% to about 0.05% selenium, still more preferably from about 0.00001% to about 0.01% selenium, even more preferably 0.00001% to about 0.005% selenium, and most preferably from about 0.00001% to about 0.001% selenium, by weight of the composition. As used herein, recitations of mass or weight percent of "selenium" in any given composition refers to the mass or weight percent of the selenium-containing component (for example, selenomethionine), rather than the mass or weight percent of the elemental selenium which is part of the selenium-containing component. Of course, wherein elemental selenium is utilized as the "selenium", the mass or weight percent of selenium in any given composition refers to that of the elemental selenium.

As used herein, "iodine" is inclusive of any compound containing iodine, including a salt, complex, or other form of iodine, including elemental iodine. Acceptable forms of iodine are well-known in the art. Non-limiting examples of iodine forms include potassium iodide, sodium iodide, potassium iodate, and sodium iodate.

Typically, wherein iodine is utilized herein, at least about 10 micrograms of iodine is included, per single dose (i.e., serving size) of the composition. More preferably, when used, at least about 15 micrograms of iodine is included, per single dose of the composition. Most preferably, when used, at least about 20 micrograms of iodine is included, per single dose of the composition. From about 10 to about 70 micrograms of iodine, per single dose of the composition, is recommended for adult humans. Preferred compositions of the present invention will comprise from 0% to about 0.1% iodine, more preferably from about 0.00001% to about 0.05% iodine, still more preferably from about 0.00001% to about 0.01% iodine, even more preferably 0.00001% to about 0.005% iodine, and most preferably from about 0.00001% to about 0.001% iodine, by weight of the composition. As used herein, recitations of mass or weight percent of "iodine" in any given composition refers to the mass or weight percent of the iodine-containing component (for example, potassium iodide), rather than the mass or weight percent of the elemental iodine which is part of the iodine-containing component. Of course, wherein elemental iodine is utilized as the "iodine", the mass or weight percent of iodine in any given composition refers to that of the elemental iodine.

As used herein, "fluorine" is inclusive of any compound containing fluorine, including a salt, complex, or other form of fluorine, including elemental fluorine. Acceptable forms of fluorine are well-known in the art. Non-limiting examples of fluorine forms include sodium fluoride, stannous fluoride, and sodium monofluorophosphate.

Typically, wherein fluorine is utilized herein, at least about 0.001 milligrams of fluorine is included, per single dose (i.e., serving size) of the composition. More preferably, when used, at least about 0.01 milligrams of fluorine is included, per single dose of the composition. Most preferably, when used, at least about 0.03 milligrams of fluorine is included, per single dose of the composition. Preferred compositions of the present invention will comprise from 0% to about 0.5% fluorine, more preferably from about 0.00001% to about 0.1% fluorine, still more preferably from about 0.0001% to about 0.05% fluorine, even more preferably 0.0001% to about 0.03% fluorine, and most preferably from about 0.0001% to about 0.01% fluorine, by weight of the composition. As used herein, recitations of mass or weight percent of "fluorine" in any given composition refers to the mass or weight percent of the fluorine-containing component (for example, sodium fluoride), rather than the mass or weight percent of the elemental fluorine which is part of the fluorine-containing component. Of course, wherein elemental fluorine is utilized as the "fluorine", the mass or weight percent of fluorine in any given composition refers to that of the elemental fluorine.

Optional Components of the Present Compositions

As stated, the compositions of the present invention may be utilized as beverage compositions. Consistent with this use, the compositions of the present invention may comprise other optional components to enhance, for example, their performance in providing one or more of the foregoing health benefits (for example, fighting infection), providing a desirable nutritional profile, and/or providing enhanced organoleptic properties. For example, one or more bracers, flavanols, non-caloric sweeteners, vitamins, emulsions, flavoring agents, coloring agents, preservatives, acidulants, water, carbonation components, and/or the like may be included in the compositions herein. Such optional components may be dispersed, solubilized, or otherwise mixed into the present compositions. These components may be added to the compositions herein provided they do not substantially hinder the properties of the composition, particularly treatment of the condition of interest. Non-limiting examples of optional components suitable for use herein are given below.

Bracers

As is commonly known in the art, bracers can be obtained by extraction from a natural source or can be synthetically produced. Non-limiting examples of bracers include methylxanthines, e.g., caffeine, theobromine, and theophylline. Additionally, numerous other xanthine derivatives have been isolated or synthesized, which may be utilized as a bracer in the compositions herein. See e.g., Bruns, *Biochemical Pharmacology*, Vol. 30, pp. 325–333 (1981) which describes, inter alia, xanthine, 9-methyl xanthine, 7-methyl xanthine, 3-methyl xanthine, 3,7-dimethyl xanthine, 8-chloromethyl-3,7-dimethyl xanthine, 8-hydroxymethyl-3,7-dimethyl xanthine, 3,7-diethyl xanthine, 3,7-bis-(2-hydroxyethyl) xanthine, 3-propyl-7-(dimethylaminoethyl) xanthine, 1-methyl xanthine, 1,9-dimethyl xanthine, 1-methyl-8-methylthio xanthine, 8-phenyl-1-methyl xanthine, 1,7-dimethyl xanthine, 1,7-dimethyl-8-oxo xanthine, 1,3-dimethyl xanthine, 1,3,9-trimethyl xanthine, 8-fluoro theophylline, 8-chloro theophylline, 8-bromo theophylline, 8-thio theophylline, 8-methylthio theophylline, 8-ethylthio theophylline, 8-nitro theophylline, 8-methylamino theophylline, 8-dimethylamino theophylline, 8-methyl theophylline, 8-ethyl theophylline, 8-propyl theophylline, 8-cyclopropyl theophylline, theophylline-8-propionate(ethyl ester), 8-benzyl theophylline, 8-cyclopentyl theophylline, 8-cyclohexyl theophylline, 8-(3-indolyl) theophylline, 8-phenyl theophylline, 9-methyl-8-phenyl theophylline, 8-(p-chlorophenyl) theophylline, 8-(p-bromophenyl) theophylline, 8-(p-methoxyphenyl) theophylline, 8-(p-nitrophenyl) theophylline, 8-(p-dimethylaminophenyl) theophylline, 8-(p-methylphenyl)theophylline, 8-(3,4-dichlorophenyl) theophylline, 8-(m-nitrophenyl) theophylline, 8-(o-nitrophenyl)theophylline, 8-(o-carboxyphenyl)theophylline, 8-(1-naphthyl) theophylline, 8-(2,6-dimethyl-4-hydroxyphenyl) theophylline, 7-methoxy-8-phenyl theophylline, 1,3,7-trimethyl xanthine, S-chloro caffeine, S-oxo caffeine, S-methoxy caffeine, S-methylamino caffeine, 8-diethylamino caffeine, 8-ethyl caffeine, 7-ethyl theophylline, 7-(2-chloroethyl) theophylline, 7-(2-hydroxyethyl) theophylline, 7-(carboxymethyl) theophylline, 7-(carboxymethyl) theophylline (ethyl ester), 7-(2-hydroxypropyl) theophylline, 7-(2,3-dihydroxypropyl) theophylline, 7-b-D-ribofuranosyl theophylline, 7-(glycero-pent-2-enopyranosyl) theophylline, 7-phenyl theophylline, 7,8-diphenyl theophylline, 1-methyl-3,7-diethyl xanthine, 1-methyl-3-isobutyl xanthine, 1-ethyl-3,7-dimethyl xanthine, 1,3-diethyl xanthine, 1,3,7-triethyl xanthine, 1-ethyl-3-propyl-7-butyl-8-methyl xanthine, 1,3-dipropyl xanthine, 1,3-diallyl xanthine, 1-butyl-3,7-dimethyl xanthine, 1-hexyl-3,7-dimethyl xanthine, and 1-(5-oxohexyl)-3,7-dimethyl xanthine.

Additionally, one or more of these bracers are present in, for example, coffee, tea, kola nut, cacao pod, mate, yaupon, guarana paste, and yoco. Natural plant extracts are the preferred sources of bracers as they may contain other compounds that delay the bioavailability of the bracer.

The most preferred methylxanthine is caffeine. Caffeine may be obtained from the aforementioned plants or, alternatively, may be synthetically prepared. Preferred botanical sources of caffeine which may be utilized as a complete or partial source of caffeine include green tea, guarana, mate, black tea, cola nuts, cocoa, and coffee. As used herein, green tea, guarana, coffee, and mate are the most preferred botanical sources of caffeine, most preferably green tea, guarana, and coffee. Mate may have the additional benefit of an appetite suppressing effect and may be included for this purpose as well.

Any bracer utilized herein is preferably present in physiologically relevant amounts, which means that the sources used in the practice of this invention provide a safe and effective quantity. Wherein a bracer is utilized in the present compositions, such compositions will preferably comprise from about 0.0005% to about 1%, more preferably from about 0.003% to about 0.5%, still more preferably from about 0.003% to about 0.2%, even more preferably from about 0.005% to about 0.05%, and most preferably from about 0.005% to about 0.02% of a bracer, by weight of the composition. Of course, as the skilled artisan will comprehend, the actual amount of bracer added will depend its biological effect, for example, effect of mental alertness on the consumer.

Flavanols

Flavanols are natural substances present in a variety of plants (e.g., fruits, vegetables, and flowers). The flavanols which may be utilized in the present invention can be extracted from, for example, fruit, vegetables, green tea or other natural sources by any suitable method well known to those skilled in the art. For example, extraction with ethyl acetate or chlorinated organic solvents is a common method to isolate flavanols from green tea. Flavanols may be extracted from either a single plant or mixtures of plants. Many fruits, vegetables, and flowers contain flavanols but to a lesser degree relative to green tea. Plants containing flavanols are known to those skilled in the art. Examples of the most common flavanols which are extracted from tea plants and other members of the *Catechu gambir* (Uncaria family) include, for example, catechin, epicatechin, gallocatechin, epigallocatechin, epicatechin gallate, and epigallocatechin gallate.

The flavanols utilized in all compositions of the present invention can be in the form of a tea extract. The tea extract can be obtained from the extraction of unfermented teas, fermented teas, partially fermented teas, and mixtures thereof. Preferably, the tea extracts are obtained from the extraction of unfermented and partially fermented teas. The most preferred tea extracts are obtained from green tea. Both hot and cold extracts can be used in the present invention. Suitable methods for obtaining tea extracts are well known. See e.g., Ekanayake, U.S. Pat. No. 5,879,733, issued Mar. 9, 1999; Tsai, U.S. Pat. No. 4,935,256, issued June, 1990; Lunder, U.S. Pat. No. 4,680,193, issued July, 1987; and Creswick, U.S. Pat. No. 4,668,525, issued May 26, 1987.

The preferred source of flavanols in the compositions of the present invention is green tea. Wherein green tea, and in particular the flavanols present in green tea, are incorporated into the beverage, the present inventors have discovered that the flavanols are at least partially responsible for delaying the bioavailability of bracers, which contributes to the reduction and/or elimination of nervousness and tension typically associated with such bracers.

Alternatively, these same flavanols may be prepared by synthetic or other appropriate chemical methods and incorporated into the present compositions. Flavanols, including catechin, epicatechin, and their derivatives are commercially available.

The amount of flavanols in the compositions of the present invention can vary. However, wherein one or more flavanols are utilized, preferably from about 0.001% to about 5%, more preferably from about 0.001% to about 2%, even more preferably from about 0.01% to about 1%, and most preferably from about 0.01% to about 0.05% of one or more flavanols is utilized, by weight of the composition.

Sweeteners

The compositions of the present invention can, and typically will, contain an effective amount of one or more sweeteners, including carbohydrate sweeteners and natural and/or artificial no/low calorie sweeteners. The amount of the sweetener used in the beverages of the present invention typically depends upon the particular sweetener used and the sweetness intensity desired. For no/low calorie sweeteners, this amount varies depending upon the sweetness intensity of the particular sweetener.

The compositions of the present invention can be sweetened with any of the carbohydrate sweeteners, preferably monosaccharides and/or disaccharides. Sweetened beverages will typically comprise from about 0.1% to about 20%, most preferably from about 6 to about 14%, sweetener. These sugars can be incorporated into the beverages in solid or liquid form but are typically, and preferably, incorporated as a syrup, most preferably as a concentrated syrup such as high fructose corn syrup. For purposes of preparing beverages of the present invention, these sugar sweeteners can be provided to some extent by other components of the beverage such as, for example, the fruit juice component and/or flavors.

Preferred sugar sweeteners for use in beverage products of the present invention are sucrose, fructose, glucose, and mixtures thereof, particularly sucrose and fructose. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein, as fructose. Other naturally occurring sweeteners or their purified extracts, such as glycyrrhizin, stevioside, the protein sweetener thaumatin, the juice of Luo Han Guo (containing the sweet mogrosides) disclosed in, for example, Fischer et al., U.S. Pat. No. 5,433,965, issued Jul. 18, 1995, and the like can also be used in the beverages of the present invention.

Effective levels of non-caloric sweeteners may optionally be used in the compositions of the present invention to further sweeten such compositions. Non-limiting examples of non-caloric sweeteners include aspartame, saccharine, cyclamates, acesulfame K, L-aspartyl-L-phenylalanine lower alkyl ester sweeteners, L-aspartyl-D-alanine amides such as, for example, those disclosed in Brennan et al., U.S. Pat. No. 4,411,925, issued 1983, L-aspartyl-D-serine amides such as, for example, those disclosed in Brennan et al., U.S. Pat. No. 4,399,163, issued 1983, L-aspartyl-hydroxymethyl alkane amide sweeteners such as, for example, those disclosed in Brand, U.S. Pat. No. 4,338,346, issued 1982, L-aspartyl-1-hydroxyethylalkane amide sweeteners such as, for example, those disclosed in Rizzi, U.S. Pat. No. 4,423,029, issued 1983, glycyrrhizins, and synthetic alkoxy aromatics. Aspartame and acesulfame-K are the most preferred non-caloric sweeteners utilized herein, and may be utilized alone or in combination.

Wherein one or more sweeteners are utilized herein, the total non-caloric sweetener is preferably utilized at levels from about 0.0001% to about 5%, more preferably from about 0.001% to about 3%, still more preferably from about 0.005% to about 2%, even more preferably from about 0.01% to about 1%, and most preferably from about 0.01% to about 0.05%, by weight of the composition.

Vitamins

As previously stated, the present compositions may optionally comprise one or more defined nutrients selected from zinc, iron, magnesium, calcium, selenium, iodine, and fluorine. The compositions herein may optionally, but preferably, be fortified further with one or more other nutrients, especially one or more vitamins. The U.S. Recommended Daily Intake (USRDI) for vitamins and minerals is defined and set forth in the Recommended Daily Dietary Allowance-Food and Nutrition Board, National Academy of Sciences-National Research Council.

Unless otherwise specified herein, wherein a given vitamin is present in the composition, the composition comprises at least about 1%, preferably at least about 5%, more preferably from about 10% to about 200%, even more preferably from about 20% to about 150%, and most preferably from about 25% to about 120% of the USRDI of such vitamin.

Non-limiting examples of vitamins include vitamin A, one or more B-complex vitamins (which include one or more of thiamine (also commonly referred to as "vitamin $B_1$"), riboflavin (also commonly referred to as "vitamin $B_2$"), niacin (also commonly referred to as "vitamin $B_3$"), pantothenic acid (also commonly referred to as "vitamin $B_5$"), pyridoxine (also commonly referred to as "vitamin $B_6$"), biotin, folic acid (also commonly referred to as folate), and the cobalamins (also commonly referred to as "vitamin $B_{12}$")), vitamin C, vitamin D, and vitamin E. Preferably, wherein a vitamin is utilized the vitamin or mineral is selected from vitamin A, niacin, thiamine, folic acid, pyroxidine, pantothenic acid, vitamin C, vitamin E, and vitamin D. Preferably, at least one vitamin is selected from vitamin A, thiamine, pyroxidine, pantothenic acid, vitamin C, and vitamin E.

As used herein, "vitamin A" is inclusive of one or more nutritionally active unsaturated hydrocarbons, including the retinoids (a class of compounds including retinol and its chemical derivatives having four isoprenoid units) and the carotenoids.

Common retinoids include retinol, retinal, retinoic acid, retinyl palmitate, and retinyl acetate.

In a preferred embodiment herein, the vitamin A is a carotenoid. Common carotenoids include beta-carotene, alpha-carotene, beta-apo-8'-carotenal, cryptoxanthin, canthaxanthin, astacene, and lycopene. Among these, beta-carotene is the most preferred for use herein.

The vitamin A may be in any form, for example, an oil, beadlets, or encapsulated. See eg., Cox et al., U.S. Pat. No. 6,007,856, assigned to The Procter & Gamble Co., issued Dec. 28, 1999. Vitamin A is often available as an oil dispersion, i.e., small particles suspended in oil.

Wherein vitamin A is present in the compositions herein, the composition typically comprises, per single dose (i.e., serving size) of the composition, at least about 1%, preferably at least about 5%, more preferably from about 10% to about 200%, even more preferably from about 15% to about 150%, and most preferably from about 20% to about 120% of the USRDI of such vitamin. Wherein vitamin A is present in the compositions herein, it is especially preferred to include about 25% of the USRDI of vitamin A, per single dose of the composition. Alternatively, the compositions preferably comprise from 0% to about 1%, more preferably from about 0.0002% to about 0.5%, also preferably from about 0.0003% to about 0.25%, even more preferably from about 0.0005% to about 0.1%, and most preferably from about 0.001% to about 0.08% of vitamin A, by weight of the composition. The ordinarily skilled artisan will understand that the quantity of vitamin A to be added is dependent on processing conditions and the amount of vitamin A delivery desired after storage.

As stated the vitamin used herein may be a B-complex vitamin. As used herein, the B-complex vitamins include one or more of thiamine (also commonly referred to as "vitamin $B_1$"), riboflavin (also commonly referred to as "vitamin $B_2$"), niacin (also commonly referred to as "vitamin $B_3$"), pantothenic acid (also commonly referred to as "vitamin $B_5$"), pyridoxine (also commonly referred to as "vitamin $B_6$"), biotin, folic acid (also commonly referred to as folate), and the cobalamins (also commonly referred to as "vitamin $B_{12}$"). Among these, inclusion of vitamin $B_1$ and/or $B_6$ are particularly preferred.

Wherein a B-complex vitamin is present in the compositions herein, the composition typically comprises at least about 1%, preferably at least about 5%, more preferably from about 10% to about 200%, even more preferably from about 15% to about 150%, and most preferably from about 20% to about 120% of the USRDI of each B-complex vitamin present in the composition, per single dose (i.e., serving size) of the composition. Wherein a B-complex vitamin is present in the compositions herein, it is especially preferred to include from about 10% to about 50% of the USRDI of each B-complex vitamin present in the composition, per single dose of the composition. Alternatively, wherein a B-complex vitamin is included within the present compositions, the compositions typically comprise from 0% to about 2%, more preferably from about 0.0002% to about 1%, also preferably from about 0.0005% to about 0.2%, even more preferably from about 0.001% to about 0.1%, and most preferably from about 0.001% to about 0.1% of each B-complex vitamin present in the composition, by weight of the composition. The ordinarily skilled artisan will understand that the quantity of B-complex vitamin to be added is dependent on processing conditions and the amount of B-complex vitamin delivery desired after storage.

As used herein, "vitamin C" is inclusive of one or more of L-ascorbic acid, as well as their bioequivalent forms including salts and esters thereof. For example, the sodium salt of L-ascorbic acid is considered vitamin C herein. Additionally, there are many widely known esters of vitamin C, including ascorbyl acetate. Fatty acid esters of vitamin C are lipid soluble and can provide an antioxidative effect.

The vitamin C utilized may be in any form, for example, free or in encapsulated form.

Wherein vitamin C is present in the compositions herein, the composition typically comprises at least about 1%, preferably at least about 5%, more preferably from about 10% to about 200%, even more preferably from about 15% to about 150%, and most preferably from about 20% to about 120% of the USRDI of such vitamin, per single dose (i.e., serving size) of the composition. Wherein vitamin C is present in the compositions herein, it is especially preferred to include about 100% of the USRDI of vitamin C, per single dose of the composition. Alternatively, wherein vitamin C is included within the present compositions, the compositions typically comprise from 0% to about 2%, more preferably from about 0.0002% to about 1%, also preferably from about 0.0003% to about 0.5%, even more preferably from about 0.0005% to about 0.2%, and most preferably from about 0.001% to about 0. 1% of vitamin C, by weight of the composition. The ordinarily skilled artisan will understand that the quantity of vitamin C to be added is dependent on processing conditions and the amount of vitamin C delivery desired after storage.

As used herein, "vitamin E" is inclusive of one or more tocols or tocotrienols which exhibit vitamin activity similar to that of alpha-tocopherol (which, as used herein, is considered a tocol) as well as their bioequivalent forms including salts and esters thereof. Vitamin E is typically found in oils including, for example, sunflower, peanut, soybean, cottonseed, corn, olive, and palm oils.

Non-limiting examples of vitamin E include alpha-tocopherol, beta-tocopherol, gamma-tocopherol, and delta-tocopherol, as well as esters thereof (e.g., alpha-tocopherol acetate). Alpha-tocopherol and particularly alpha-tocopherol acetate are highly preferred for use as vitamin E herein.

The vitamin E utilized may be in any form, for example, free or in encapsulated form.

Wherein vitamin E is present in the compositions herein, the composition typically comprises at least about 1%, preferably at least about 5%, more preferably from about 10% to about 200%, even more preferably from about 15% to about 150%, and most preferably from about 20% to about 120% of the USRDI of such vitamin, per single dose (i.e., serving size) of the composition. Wherein vitamin E is present in the compositions herein, it is especially preferred to include about 25% of the USRDI of vitamin E, per single dose of the composition. Alternatively, wherein vitamin E is included within the present compositions, the compositions typically comprise from 0% to about 2%, more preferably from about 0.0002% to about 1%, also preferably from about 0.0003% to about 0.2%, even more preferably from about 0.0005% to about 0.1%, and most preferably from about 0.001% to about 0.1% of vitamin E, by weight of the composition. The ordinarily skilled artisan will understand that the quantity of vitamin E to be added is dependent on processing conditions and the amount of vitamin E delivery desired after storage.

Emulsions

Dilute juice beverages of the present invention may optionally, but preferably, comprise from about 0.2% to about 5%, preferably from about 0.5% to about 3%, and most preferably from about 0.8% to about 2%, of a beverage emulsion. This beverage emulsion can be either a cloud emulsion or a flavor emulsion.

For cloud emulsions, the clouding agent can comprise one or more fats or oils stabilized as an oil-in-water emulsion using a suitable food grade emulsifier. Any of a variety of fats or oils may be employed as the clouding agent, provided that the fat or oil is suitable for use in foods and/or beverages. Preferred are those fats and oils that have been refined, bleached and deodorized to remove off-flavors. Especially suitable for use as clouding agents are those fats that are organoleptically neutral. These include fats from the following sources: vegetable fats such as soybean, corn, safflower, sunflower, cottonseed, canola, and rapeseed; nut fats such as coconut, palm, and palm kernel; and synthetic fats. See e.g., Kupper et al., U.S. Pat. No. 4,705,691, issued Nov. 10, 1987, for suitable fat or oil clouding agents.

Any suitable food grade emulsifier can be used that can stabilize the fat or oil clouding agent as an oil-in-water emulsion. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See e.g., Kupper et al., U.S. Pat. No. 4,705,691, issued Nov. 10, 1987. Modified starches treated to contain hydrophobic as well as hydrophilic groups, such as those described in Caldwell et al., U.S. Pat. No. 2,661,349, are preferred emulsifiers for use as herein. Octenyl succinate (OCS) modified starches such as those described in Marotta et al., U.S. Pat. No. 3,455,838 and Barndt et al., U.S. Pat. No. 4,460,617 are especially preferred emulsifiers.

The clouding agent can be combined with a weighting agent to provide a beverage opacifier that imparts a total or partial opaque effect to the beverage without separating out and rising to the top. The beverage opacifier provides the appearance to the consumer of a juice-containing beverage. Any suitable weighting oil can be employed in the beverage opacifier. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters which are nondigestible. See e.g., Brand et al., U.S. Pat. No. 4,705,690, issued Nov. 10, 1987.

The cloud/opacifier emulsion is prepared by mixing the clouding agent with the weighting agent (for opacifier emulsions), the emulsifier and water. The emulsion typically contains from about 0.1% to about 25% clouding agent, from about 1% to about 20% weighting oil agent (in the case of opacifier emulsions), from about 1% to about 30% emulsifiers, and from about 25% to about 97.9% water (or quantum satis).

The particle size of the water-insoluble components of the emulsion is reduced by employing a suitable apparatus known in the art. Because the ability of emulsifying agents to hold oil in suspension is proportional to particle size, emulsions of particles with diameters of about 0.1 to about 3.0 microns are suitable. Preferably, the particles are about 2.0 microns or less in diameter. Most preferred is an emulsion in which substantially all the particles are 1.0 microns or less in diameter. The particle size is reduced by passing the mixture through an homogenizer, colloid mill or turbine-type agitator. Usually one or two passes is sufficient. See e.g., Kupper et al., U.S. Pat. No. 4,705,691, issued Nov. 10, 1987.

Flavor emulsions useful in beverage products of the present invention comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus oils and essences can also be used herein. Examples of suitable flavors include, for example, fruit flavors such as orange, lemon, lime and the like, cola flavors, tea flavors, coffee flavors, chocolate flavors, dairy flavors. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See e.g., Kupper et al., U.S. Pat. No. 4,705,691, issued Nov. 10, 1987.

Flavor emulsions are typically prepared in the same manner as cloud/opacifier emulsions by mixing one or more flavoring oils (from about 0.001% to about 20%) with an emulsifying agent (from about 1% to about 30%) and water. (The oil clouding agents can also be present). Emulsions of particles with diameters of from about 0.1 to about 3.0 microns are suitable. Preferably, the particles are about 2.0 microns or less in diameter. Most preferably, the particles are about 1.0 microns or less in diameter. The emulsifying agent coats the particularized flavor oil to aid in preventing coalescence and in maintaining an appropriate dispersion. The viscosity and specific gravity of the flavor emulsion are regulated to be compatible with the finished beverage. See e.g., Kupper et al., U.S. Pat. No. 4,705,691, issued Nov. 10, 1987.

Flavoring Agents

One or more flavoring agents are recommended for the embodiments of the present invention in order to enhance their palatability. Any natural or synthetic flavor agent can be used in the present invention. For example, one or more botanical and/or fruit flavors may be utilized herein. As used herein, such flavors may be synthetic or natural flavors.

Particularly preferred fruit flavors are exotic and lactonic flavors such as, for example, passion fruit flavors, mango flavors, pineapple flavors, cupuacu flavors, guava flavors, cocoa flavors, papaya flavors, peach flavors, and apricot flavors. Besides these flavors, a variety of other fruit flavors can be utilized such as, for example, apple flavors, citrus flavors, grape flavors, raspberry flavors, cranberry flavors, cherry flavors, grapefruit flavors, and the like. These fruit flavors can be derived from natural sources such as fruit juices and flavor oils, or may alternatively be synthetically prepared.

Preferred botanical flavors include, for example, tea (preferably black and green tea, most preferably green tea), aloe vera, guarana, ginseng, ginkgo, hawthorn, hibiscus, rose hips, chamomile, peppermint, fennel, ginger, licorice, lotus seed, schizandra, saw palmetto, sarsaparilla, safflower, St. John's Wort, curcuma, cardimom, nutmeg, cassia bark, buchu, cinnamon, jasmine, haw, chrysanthemum, water chestnut, sugar cane, lychee, bamboo shoots, vanilla, coffee, and the like. Preferred among these is tea, guarana, ginseng, ginko, and coffee. In particular, the combination of tea flavors, preferably green tea or black tea flavors (preferably green tea), optionally together with fruit flavors has an appealing taste. In another preferred embodiment, coffee is included within the present compositions. A combination of green tea and coffee in the present compositions is often preferred.

The flavor agent can also comprise a blend of various flavors. If desired, the flavor in the flavoring agent may be formed into emulsion droplets which are then dispersed in the beverage composition or concentrate. Because these droplets usually have a specific gravity less than that of water and would therefore form a separate phase, weighting agents (which can also act as clouding agents) can be used to keep the emulsion droplets dispersed in the beverage composition or concentrate. Examples of such weighting agents are brominated vegetable oils (BVO) and resin esters, in particular the ester gums. See L. F. Green, Developments in Soft Drinks Technology, Vol. 1, Applied Science Publishers Ltd., pp. 87–93 (1978) for a further description of the use of weighting and clouding agents in liquid beverages. Typically the flavoring agents are conventionally available as concentrates or extracts or in the form of synthetically produced flavoring esters, alcohols, aldehydes, terpenes, sesquiterpenes, and the like.

Coloring Agent

Small amounts of one or more coloring agents may be utilized in the compositions of the present invention. FD&C dyes (e.g., yellow #5, blue #2, red #40) and/or FD&C lakes are preferably used. By adding the lakes to the other powdered ingredients, all the particles, in particular the colored iron compound, are completely and uniformly colored and a uniformly colored beverage mix is attained. Preferred lake dyes which may be used in the present invention are the FDA-approved Lake, such as Lake red #40, yellow #6, blue #1, and the like. Additionally, a mixture of FD&C dyes or a FD&C lake dye in combination with other conventional food and food colorants may be used. Riboflavin and b-carotene may also be used. Additionally, other natural coloring agents may be utilized including, for example, fruit, vegetable, and/or plant extracts such as grape, black currant, aronia, carrot, beetroot, red cabbage, and hibiscus.

The amount of coloring agent used will vary, depending on the agents used and the intensity desired in the finished product. The amount can be readily determined by one skilled in the art. Generally, if utilized, the coloring agent should be present at a level of from about 0.0001% to about 0.5%, preferably from about 0.001% to about 0.1%, and most preferably from about 0.004% to about 0.1%, by weight of the composition.

Preservatives

Preservatives may or may not be needed for use in the present compositions. Techniques such as aseptic and/or clean-fill processing may be utilized to avoid preservatives.

One or more preservatives may, however, optionally be added to the present compositions. Preferred preservatives include, for example, sorbate, benzoate, and polyphosphate preservatives (for example, sodium hexametapolyphosphate).

Preferably, wherein a preservative is utilized herein, one or more sorbate or benzoate preservatives (or mixtures thereof) are utilized. Sorbate and benzoate preservatives suitable for use in the present invention include sorbic acid, benzoic acid, and salts thereof, including (but not limited to) calcium sorbate, sodium sorbate, potassium sorbate, calcium benzoate, sodium benzoate, potassium benzoate, and mixtures thereof. Sorbate preservatives are particularly preferred. Potassium sorbate is particularly preferred for use in the present invention.

Wherein a composition comprises a preservative, the preservative is preferably included at levels from about 0.0005% to about 0.5%, more preferably from about 0.001% to about 0.4% of the preservative, still more preferably from about 0.001% to about 0.1%, even more preferably from about 0.001% to about 0.05%, and most preferably from about 0.003% to about 0.03% of the preservative, by weight of the composition. Wherein the composition comprises a mixture of one or more preservatives, the total concentration of such preservatives is preferably maintained within these ranges.

Acidulants

If desired, the present compositions may optionally comprise one or more acidulants. An amount of an acidulant may be used to maintain the pH of the composition. Compositions of the present invention preferably have a pH of from about 2 to about 7, more preferably from about 2.5 to about 7, and most preferably from about 3.5 to about 4.5. Beverage acidity can be adjusted to and maintained within the requisite range by known and conventional methods, e.g., the use of one or more of the aforementioned acidulants. Typically, acidity within the above recited ranges is a balance between maximum acidity for microbial inhibition and optimum acidity for the desired beverage flavor.

Organic as well as inorganic edible acids may be used to adjust the pH of the beverage, and may be added additional to the acid serving as part of the second component herein. The acids can be present in their undissociated form or, alternatively, as their respective salts, for example, potassium or sodium hydrogen phosphate, potassium or sodium dihydrogen phosphate salts. The preferred acids are edible organic acids which include citric acid, malic acid, fumaric acid, adipic acid, phosphoric acid, gluconic acid, tartaric acid, ascorbic acid, acetic acid, phosphoric acid or mixtures thereof. The most preferred acids are citric and malic acids.

The acidulant can also serve as an antioxidant to stabilize beverage components. Examples of commonly used antioxidant include but are not limited to ascorbic acid, EDTA (ethylenediaminetetraacetic acid), and salts thereof.

Water

Water is not necessary for dry beverage compositions (as used herein, "dry beverage compositions" are substantially dry (meaning, comprising from 0% to about 4%, preferably from 0% to about 3% water) compositions which are suitable for dilution with water or other liquids to form a concentrated or ready-to-drink beverage composition. Since dry beverage compositions will be diluted with water or another liquid prior to consumption, the benefits of the present invention, for example, mineral stabilization and/or organoleptic improvement through provision of the arabinogalactan, are still realized.

Therefore, the compositions may comprise from 0% to about 99.999% water, by weight of the composition. Beverage compositions which are not "dry beverage compositions" typically comprise at least about 4% water, preferably at least about 20% water, more preferably at least about 40% water, still more preferably at least about 50% water, even more preferably at least about 75% water, and most preferably at least about 80% water. Still further, ready-to-drink beverage compositions will typically comprise at least about 50% water. The water included at these levels includes all added water and any water present in combination components, for example, fruit juice.

Carbonation Component

Carbon dioxide can be introduced into the water which is mixed with a beverage concentrate or into a beverage composition after dilution to achieve carbonation. The carbonated beverage can be placed into a container, such as a bottle or can, and then sealed. Any conventional carbonation methodology may be utilized to make carbonated beverage compositions of this invention. The amount of carbon dioxide introduced into the beverage will depend upon the particular flavor system utilized and the amount of carbonation desired.

EXAMPLES

The following are non-limiting examples of compositions used in accordance with the present invention. The compositions are prepared utilizing conventional methods. The following examples are provided to illustrate the invention and are not intended to limit the scope thereof in any manner.

Example 1

An orange-flavored beverage dry beverage composition is prepared having the following ingredients:

| Component | Weight Percent (%) |
| --- | --- |
| Sugar | 79.81 |
| Orange Flavor | 1.65 |
| Xanthan Gum | 0.15 |
| Coloring Agents | 0.13 |
| Tricalcium Phosphate | 0.38 |
| Citric Acid | 3.14 |
| Arabinogalactan (CLEARTRAC, commercially available from Larex, Inc., St. Paul, MN) | 14 |
| FERROCHEL (amino acid chelated iron, commercially available from Albion Laboratories, Salt Lake City, Utah), Zinc amino acid chelate, Magnesium creatine, Potassium Iodide | 0.74 |

All of the components are mixed together to form a composition of the present invention. To also form a ready-to-drink beverage of the present composition, 25 grams of the orange-flavored dry beverage composition is added to 200 mL water.

Example 2

A flavored coffee beverage, in powder form, is prepared having the following ingredients:

| Component | Weight Percent (%) |
|---|---|
| SIMPLESSE (whey protein, commercially available from NutraSweet Co., Chicago, IL) | 9.24 |
| Modified Starch | 5.48 |
| Sugar | 17.96 |
| Creamer | 31.41 |
| Flavoring Agent | 9.39 |
| Instant Coffee | 9.82 |
| Artificial Sweeteners | 0.30 |
| Dipotassium Phosphate | 2.48 |
| Ferrous fumarate | 0.01 |
| Zinc gluconate | 0.01 |
| Potassium Iodide | 0.4 |
| Arabinogalactan (CLEARTRAC, commercially available from Larex, Inc., St. Paul, MN) | 13.5 |

All of the components are mixed together to form a composition of the present invention. To also form a ready-to-drink coffee beverage of the present composition, 26 grams of the powdered, flavored coffee beverage is added to 240 mL of hot water.

Example 3

A ready-to-drink fruit juice beverage is prepared having the following ingredients:

| Component | Weight Percent (%) |
|---|---|
| Mixture 1 | 1.17 |
| Mixture 2 | 1.14 |
| Arabinogalactan (IMMUNENHANCER, commercially available from Larex, Inc., St. Paul, MN) | 1.43 |
| Potassium Sorbate | 0.03 |
| Citric Acid | 0.44 |
| Thickeners | 0.06 |
| Sodium Hexametaphosphate | 0.1 |
| High Fructose Corn Syrup | 14.7 |
| Ascorbic Acid | 0.04 |
| Zinc amino acid chelate | 0.007 |
| FERROCHEL iron amino acid chelate (commercially available from Albion Laboratories, Salt Lake City, Utah) | 0.008 |
| Magnesium Citrate | 0.24 |
| Water | quantum satis |

Mixture 1 of this Example 3 contains the following components:

| Component | Weight Percent (%) |
|---|---|
| Potassium Sorbate | 0.05 |
| Flavor Oils | 2.1 |
| Fruit Juice Concentrate | 78.93 |
| Vitamin $B_1$ | 0.01 |
| Coloring Agents | 0.28 |
| Citric Acid | 0.43 |
| Water | quantum satis |

Mixture 2 of this Example 3 contains the following components:

| Component | Weight Percent (%) |
|---|---|
| beta-Carotene | 0.34 |
| Ascorbic Acid | 0.043 |
| Vitamin $B_6$ | 0.023 |
| Emulsifier | 10.5 |
| Sunflower Oil | 13.1 |
| Vitamin E Acetate | 0.31 |
| Citric Acid | 0.97 |
| Potassium Sorbate | 0.25 |
| Water | quantum satis |

Mixtures 1 and 2 are separately prepared according to standard methods. Mixtures 1 and 2 are then combined with the remaining components to provide the ready-to-drink fruit juice beverage.

Example 4

A beverage composition is prepared by blending the following components in a conventional manner:

| Component | Weight Percent |
|---|---|
| Glucose | 4 |
| Sucrose | 5.86 |
| Maltodextrin | 2 |
| Fruit Juice | 10 |
| Green Tea Extract | 0.12 |
| Guarana Extract | 0.06 |
| Ascorbic Acid | 0.04 |
| Arabinogalactan (CLEARTRAC, commercially available from Larex, Inc., St. Paul, MN) | 1.1 |
| Sodium Citrate | 0.1 |
| Citric Acid | 0.2 |
| Flavors | 0.13 |
| SUNACTIVE iron | 0.01 |
| Water | quantum satis |

What is claimed is:

1. A ready-to-drink beverage composition comprising:
   a) a first component which is arabinogalactan, wherein the composition comprises from about 0.01% to about 10% of the arabinogalactan, by weight of the composition;
   b) a second component comprising one or more minerals selected from the group consisting of zinc, iron, magnesium, calcium, selenium, iodine, and fluorine; and
   c) at least about 50% water.

2. A composition according to claim 1 comprising:
   (a) from 0% to about 0.1% of zinc, by weight of the composition;
   (b) from 0% to about 0.1% of iron, by weight of the composition;
   (c) from 0% to about 1% of magnesium, by weight of the composition;
   (d) from 0% to about 5% of calcium, by weight of the composition;
   (e) from 0% to about 0.1% of selenium, by weight of the composition;
   (f) from 0% to about 0.1% of iodine, by weight of the composition; and
   (g) from 0% to about 0.5% of fluorine, by weight of the composition.

3. A composition according to claim 2 wherein:
(a) when the composition comprises zinc, the composition comprises from about 0.0001% to about 0.08% of zinc, by weight of the composition;
(b) when the composition comprises iron, the composition comprises from about 0.0001% to about 0.08%. of zinc, by weight of the composition;
(c) when the composition comprises magnesium, the composition comprises from about 0.001% to about 0.8% of magnesium, by weight of the composition;
(d) when the composition comprises calcium, the composition comprises from about 0.01% to about 0.5% of calcium, by weight of the composition;
(e) when the composition comprises selenium, the composition comprises from about 0.00001% to about 0.05% of selenium, by weight of the composition;
(f) when the composition comprises iodine, the composition comprises from about 0.00001% to about 0.05% of iodine, by weight of the composition; and
(g) when the composition comprises fluorine, the composition comprises from about 0.00001% to about 0.1% of iodine, by weight of the composition.

4. A composition according to claim 3 which has a pH of from about 2.5 to about 7.

5. A composition according to claim 4 comprising at least about 1% fruit juice, by weight of the composition.

6. A composition according to claim 5 comprising iron.

7. A composition according to claim 6 wherein the iron is selected from the group consisting of ferrous sulfate, ferrous fumarate, ferrous succinate, ferrous gluconate, ferrous lactate, ferrous tartrate, ferrous citrate, amino acid chelated iron, ferric pyrophosphate, and mixtures thereof.

8. A composition according to claim 7 wherein the iron is amino acid chelated iron.

9. A composition according to claim 7 wherein the iron is ferric pyrophosphate.

10. A composition according to claim 5 comprising magnesium.

11. A composition according to claim 5 comprising calcium.

12. A composition according to claim 11 wherein the calcium is calcium citrate malate.

13. A composition according to claim 11 comprising zinc and calcium.

14. A composition according to claim 11 comprising zinc, calcium, and magnesium.

15. A composition according to claim 14 comprising zinc, calcium, magnesium, and iron.

16. A composition according to claim 5 comprising zinc.

17. A composition according to claim 16 wherein the zinc is selected from the group consisting of zinc sulfate, zinc chloride, zinc acetate, zinc gluconate, zinc ascorbate, zinc citrate, zinc aspartate, zinc picolinate, amino acid chelated zinc, zinc oxide, and mixtures thereof.

18. A composition according to claim 17 wherein the zinc is amino acid chelated zinc.

* * * * *